United States Patent Office 3,317,526
Patented May 2, 1967

3,317,526
OMEGA-TERTIARYAMINO BUTYNOL-1-PHEN-
YLCYCLOALKANE CARBOXYLATES
Johan Richard Dahlbom, Sodertalje, Sweden, assignor to
Aktiebolaget Astra, Apotekarnes Kemiska Fabriker,
Sodertalje, Sweden, a company of Sweden
No Drawing. Filed July 16, 1964, Ser. No. 383,214
7 Claims. (Cl. 260—247.2)

The present invention relates to new chemical compounds having valuable therapeutic properties.

More particularly, the compounds of the present invention are the substituted 4-amino-2-butynyl 1-phenylcycloalkane-1-carboxylates and salts thereof with physiologically acceptable acids, especially hydrohalides.

The novel compounds of the present invention are represented by the following formula:

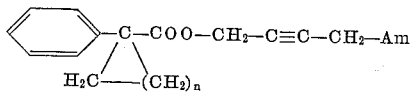

wherein $n$ is 3 or 4, and Am is an amino radical selected from the group consisting of pyrrolidino, piperidino, morpholino and lower dialkylamino wherein the alkyl groups contain from 1 to 5 carbon atoms.

The salts of the physiologically acceptable acids are also in this scope of the present invention. Suitable physiologically acceptable acids include, but are not limited to, hydrohalides, sulphuric acid, phosphoric acid, acetic acid, citric acid, tartaric acid, succinic acid, picrinic acid and the natural and semi-synthetic penicillin acids. Of the foregoing acids, hydrochloric and hydrobromic acids are preferred because of their ready availability.

The novel compounds of the present invention are particularly valuable for the treatment of Parkinson's disease. In this application they showed a particularly high antagonism to both tremorine and its metabolite oxotremorine, as well as an exceptional freedom from side effects.

For some years, tremorine (1,4-bis-(pyrrolidino)-2-butyn) has been employed to test the effectiveness of drugs useful for controlling Parkinson's disease. Tremorine when injected into several species of laboratory animals induces tremors and spasticity similar to the characteristic symptoms of Parkinson's disease in humans. It is well-known that compounds, such as atropin or caramiphen, which are useful in the treatment of Parkinson's disease, antagonize the effects of tremorine in laboratory animals.

An even more potent compound useful for evaluating anti-Parkinson drugs is the metabolite of tremorine, oxotremorine (1-(2-oxopyrrolidino)-4-pyrrolidino-2-butyn). Whereas the characteristic effects of tremorine are observed only after a latent period of a few minutes, the effects of the active metabolite are observed immediately after intravenous injection. The active metabolite induces violent generalized tremors, spasticity, hypokinesia and parasympathomimetic effects which are strikingly similar to the symptoms of Parkinson's disease in humans. The antagonistic effect of anti-Parkinson drugs to oxotremorine is a particularly sensitive way of evaluating new anti-Parkinson drugs.

It is well-known that the established drugs for the treatment of Parkinson's disease such as atropin or caramiphen induce undesired side-effects. The mydriatic effect of these compound is a useful indicator of the extent of the undesired side effects which will result. The ratio of the tremorolytic activity to the mydriatic activity, therefore, is a useful characterization of the merit of a drug for the treatment of Parkinson's disease and indicates the degree of specificity of the drug for this purpose.

The novel compounds of the present invention have valuable therapeutic activity and are characterized by only slight side-effects as compared with the established drugs atropin or caramiphen. In terms of the foregoing tests, the substituted 4-amino-2-butynyl 1-phenylcycloalkane-1-carboxylates and physiologically acceptable acids thereof, show a high specificity for the treatment of Parkinson's disease, i.e. a high ratio tremorolytic activity to mydriatic activity.

The substituted 4-amino-2-butynyl 1-phenylcycloalkane-1-carboxylates may be prepared by several processes. The preferred method of preparation employs a Mannich reaction according to the general scheme:

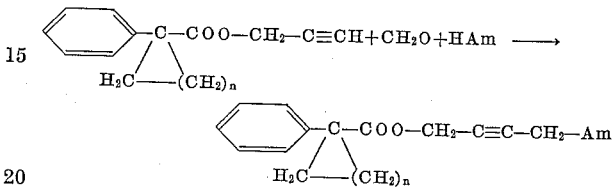

In another process for the preparation of substituted 4-amino-2-butynyl 1-phenylcycloalkane-1-carboxylates, 1-phenylcyclopentane-1-carbonyl chloride of the formula:

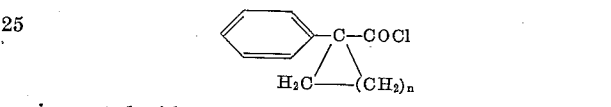

is reacted with a substituted 4-amino-2-butyn-1-ol of the formula:

$$HO\text{---}CH_2\text{---}C\equiv C\text{---}CH_2\text{---}Am$$

In still another process transesterification is employed as follows:

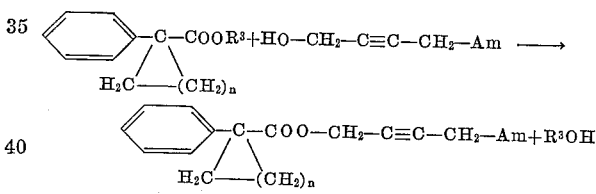

In the foregoing reaction mechanisms $n$ and Am are as defined above in col. 1. In the immediately preceding reaction $R^3$ may be any convenient hydrocarbon residue, normaly a lower aliphatic group which contains from 1 to 10 carbon atoms, and is free of groups which interfere with the transesterification reaction.

The preparation of the novel compounds of the present invention is illustrated by the following examples.

*Example 1*

A mixture of 35 g. of 1-phenyl-cyclopentane-1-carbonyl chloride and 10 g. of propargyl alcohol was boiled under reflux for 15 minutes. The mixture was then distilled under vacuum and the fraction with a boiling point of 107°–108° C. at 0.3 mm. Hg, which consists of propargyl 1-phenylcyclopentane-1-carboxylate, is collected.

10 g. of the propargyl ester, of 3.4 g. of pyrrolidine, 1.6 g. of paraformaldehyde and 0.15 g. of cuprous chloride were boiled under reflux in 30 ml. of dioxane for 10 minutes. After boiling, 150 ml. of water were added and the solution was extracted twice with 100 ml. of ether to remove impurities. The ether extracts were discarded. The aminoester was then precipitated by adding a sufficient amount of 5 N ammonia to the aqueous solution to make the solution alkaline. The aminoester was precipitated and re-dissolved in ether. The ether solution was dried. 4-pyrrolidino-2-butynyl 1-phenylcyclopentane-1-carboxylate was precipitated as its hydrochloride by the addition of a dry ethereal solution of hydrogen chloride. The hydrochloride was recrystallized from a mixture of alcohol and ether (2:1). Colorless crystals having a melting point of 105°–107° C. were obtained.

In an analogous manner the following hydrochlorides were obtained:

4-diethylamino-2-butynyl 1-phenylcyclopentane-1-carboxylate hydrochloride, melting point 93°–94° C., 4-diethylamino-2-butynyl 1-phenylcyclohexane-1-carboxylate hydrochloride, melting point 126°–128° C., 4-piperidino-2-butynyl 1-phenylcyclopentane-1-carboxylate hydrochloride, melting point 124°–126° C.

*Example 2*

A solution of 11.5 g. of 1-phenylcyclopentane-1-carbonyl chloride, 7 g. of 4-diethylamino-2-butyn-1-ol and 6 g. of triethylamine in 75 ml. of benzene were boiled under reflux for 2 hours. After cooling the triethylammonium chloride formed was filtered off and the benzene solution was washed with 50 ml. portions of water. The benzene phase was then extracted with 1 N hydrochloric acid. The acid extracts were made alkaline and the base thus precipitated was taken up in ether. After drying the ether solution over potassium carbonate the hydrochloride was precipitated by the addition of a dry ethereal solution of hydrogen chloride. Recrystallization from ethanol-ether (2:1) yielded colorless crystals of a melting point of 93°–94° C. consisting of the hydrochloride of 4-diethylamino-2-butynyl 1-phenylcyclopentane-1-carboxylate.

In an analogous manner the following hydrochlorides were obtained:

4-pyrrolidino-2-butynyl 1-phenylcyclohexane-1-carboxylate hydrochloride, melting point of 127°–129° C., 4-morpholino-2-butynyl 1-phenylcyclopentane-1-carboxylate hydrochloride, melting point of 123°–125° C.

*Example 3*

One-half gram of sodium and 2.5 grams of methyl 1-phenylcyclopentane-1-carboxylate were added in succession to 7 grams of 4-diethylamino-2-butyn-1-ol. The reaction mixture was treated for 3 hours at 50° C. at a pressure of 10 mm. Hg 100 ml. of water was then added and the pH of the solution adjusted to 5 and extracted with 50 ml. of ether to remove unreacted methyl ester. The solution was then made alkaline and was extracted with ether. On the addition of dry ethereal hydrogen chloride, the hydrochloride of 4-diethylamino-2-butynyl 1-phenylcyclopentane-1-carboxylate precipitated. Crystallization from ethanol-ether (2:1) gave colorless crystals of a melting point of 92°–94° C.

I claim:

1. A compound selected from the group consisting of 4-amino-2-butynyl 1-phenylcycloalkane-1-carboxylates of the formula:

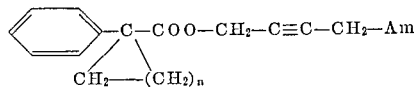

and the addition salts thereof with physiologically acceptable acids wherein $n$ is an integer selected from the group consisting of 3 and 4 and Am is selected from the group consisting of pyrrolidino, piperidino, morpholino and lower dialkylamino wherein the alkyl groups have from 1 to 5 carbon atoms, and wherein said group is attached to the butynyl nucleus of said formula at the amino nitrogen.

2. A compound selected from the group consisting of 4-diethylamino-2-butynyl 1-phenylcyclopentane-1-carboxylate and salts thereof with physiologically acceptable acids.

3. A compound selected from the group consisting of 4-diethylamino-2-butynyl 1-phenylcyclohexane-1-carboxylate and salts thereof with physiologically acceptable acids.

4. A compound selected from the group consisting of 4-pyrrolidino-2-butynyl 1-phenylcyclopentane-1-carboxylate and salts thereof with physiologically acceptable acids.

5. A compound selected from the group consisting of 4-pyrrolidino-2-butynyl 1-phenylcyclohexane-1-carboxylate and salts thereof with physiologically acceptable acids.

6. A compound selected from the group consisting of 4-piperidino-2-butynyl 1-phenylcyclopentane-1-carboxylate and salts thereof with physiologically acceptable acids.

7. A compound selected from the group consisting of 4-morpholino-2-butynyl 1-phenylcyclopentane-1-carboxylate and salts thereof with physiologically acceptable acids.

References Cited by the Examiner

Dahlbom et al., Chemical Abstracts, vol. 59, pp. 8720–30 (1963).

ALEX MAZEL, *Primary Examiner.*

JOSE TOVAR, *Assistant Examiner.*